US005954787A

United States Patent [19]

Eun

[11] Patent Number: 5,954,787

[45] Date of Patent: Sep. 21, 1999

[54] METHOD OF GENERATING SINE/COSINE FUNCTION AND APPARATUS USING THE SAME FOR USE IN DIGITAL SIGNAL PROCESSOR

[75] Inventor: Myung-Su Eun, Seoul, Rep. of Korea

[73] Assignee: Daewoo Electronics Co., Ltd., Taiwan

[21] Appl. No.: 08/982,281

[22] Filed: Dec. 1, 1997

[30] Foreign Application Priority Data

Dec. 26, 1996 [KR] Rep. of Korea ...................... 96-72075

[51] Int. Cl.[6] ........................................ G06F 1/02

[52] U.S. Cl. ........................................ 708/276

[58] Field of Search .................................. 708/270, 271, 708/272, 273, 276, 440, 441

[56] References Cited

U.S. PATENT DOCUMENTS

| | | | |
|---|---|---|---|
| 3,898,446 | 8/1975 | Vatz | 708/441 |
| 4,718,018 | 1/1988 | Sloane . | |
| 4,827,442 | 5/1989 | Mehrgardt et al. | 708/276 |
| 5,111,163 | 5/1992 | Erlich . | |
| 5,121,412 | 6/1992 | Borth . | |
| 5,513,219 | 4/1996 | Ham . | |
| 5,517,433 | 5/1996 | Morrison . | |
| 5,533,071 | 7/1996 | Krishnamurthy . | |

*Primary Examiner*—Chuong Dinh Ngo
*Attorney, Agent, or Firm*—Pillsbury Madison & Sutro

[57] ABSTRACT

A method of generating sine/cosine function and an apparatus using the same in digital signal processor are disclosed. The method for generating sine/cosine function values corresponding to a first digital phase values, comprising the steps of: a) receiving a second digital phase values, obtained by performing 2π modulo operation for the first digital phase values, having the first bit group representing a quadrant and the second bit group representing a phase value, at each first clock; b) forming a look-up table having as much storage locations as determined by the second bit group, for converting phase values of any one quadrant to one of sine and cosine function values; c) generating a first address signal from the second bit group and a second address signal by inverting the second bit group; d) generating sine and cosine function values for the same phase value corresponding to both the first and second address signals by accessing the look-up table, at each second clock being faster than the first clock; and e) generating sine and cosine function values for the first digital phase values by multiplexing the sine and cosine function values obtained in the step d) according to the first bit group. Therefore, the capacity of memory needed for the look-up table can be decreased without an excessive increase in hardware.

12 Claims, 5 Drawing Sheets

METHOD OF GENERATING SINE/COSINE FUNCTION AND APPARATUS USING THE SAME FOR USE IN DIGITAL SIGNAL PROCESSOR

BACKGROUND OF THE INVENTION

1. Field of the Invention

The present invention relates to a method of generating sine/cosine function and an apparatus using the same in digital signal processor, and more particularly to a method for generating sine/cosine function values corresponding to phase values of first to fourth quadrants by utilizing a look-up table having one of sine and cosine function values corresponding to phase values of any one quadrant, and an apparatus using the same.

2. Description of the Prior Art

Generally, in digital communication system, a phase error (θ) is generated when phases of a carrier signal between a transmitting side and a receiving side are not synchronized during a transmission of a complex symbol. At this time, the transmitted complex symbol is multiplied by $e^{j\theta}$, affecting demodulated complex symbols. As a result, the demodulated complex symbol rotates in a complex plane as much as the phase error (θ). Due to this rotation, the demodulated complex symbol is moved to the detection area of other symbols in a constellation, and an error is generated during symbol detection process. Therefore, a reliable decoding depends on an accurate phase synchronization, and for this purpose, a carrier recovery circuit in receiver is utilized.

The carrier recovery circuit comprises a phase locked loop (PLL). The PLL comprises a phase error detector, a loop filter, and a trigonometric function look-up table. Here, the phase error detector detects a phase error from the phase component of a pure carrier signal, in which the phase component generated by the modulation process is removed from a received signal. The phase error (θ) with removed high frequency band component by the loop filter is applied to the trigonometric function look-up table to generate a phase-corrected signal (cos θ−jsin θ), and the original carrier signal is recovered by complex multiplying the phase-corrected signal (cos θ−jsin θ) by the received signal.

The sine and cosine function values necessary for generating the phase-corrected signal (cos θ−jsin θ) are stored in the look-up table. These function values are obtained faster by utilizing the look-up table than a circuit for directly calculating them, hence it is widely used in various related fields.

FIG. 1 shows an input/output relation of a conventional trigonometric function look-up table used for the above described process. Referring to FIG. 1, a first phase signal (θ') is divided by 2π in a 2π modulo operator 11, and the remainder value is outputted as a second phase signal (θ). A sine look-up table 12 and a cosine look-up table 13 output respectively sine function values (sin θ) and cosine function values (θ) stored in a location addressed by the second phase signal (θ).

Meanwhile, when the sine and cosine look-up tables 12 and 13 illustrated in FIG. 1 are stored in a read-only-memory (ROM), they have a memory map as illustrated in FIG. 2. For example, the sine look-up table 12 stores $2^n$ number of the function value for phase signals of n-bits in the range of 0 to 2π.

Accordingly, separate look-up tables are required to generate sine and cosine function values, respectively. Consequently, $2^n$ number of storage location is required when the phase signal (θ) is composed of n-bits, and at least $2^n$×M bits storage capacity is required for each look-up table when the function values are composed of M-bits. In this case, the conventional look-up table has a problem in that the higher the accuracy for the function value, the look-up table capacity increases.

SUMMARY OF THE INVENTION

In view of the foregoing, it is an object of the present invention to provide a method for generating sine/cosine function values corresponding to phase values of first to fourth quadrants by utilizing a look-up table having one of sine and cosine function values corresponding to phase values of any one quadrant.

It is another object of the present invention to provide a sine/cosine function generating apparatus for decreasing the capacity of a look-up table used to generate sine/cosine function values corresponding to phase values of all quadrants.

In order to achieve the first object, the present invention provides a method for generating sine/cosine function values corresponding to a first digital phase values, comprising the steps of: a) receiving a second digital phase values, obtained by performing 2π modulo operation for the first digital phase values, having the first bit group representing a quadrant and the second bit group representing a phase value, at each first clock; b) forming a look-up table having as much storage locations as determined by the second bit group, for converting phase values of any one quadrant to one of sine and cosine function values; c) generating a first address signal from the second bit group and a second address signal by inverting the second bit group; d) generating sine and cosine function values for the same phase value corresponding to both the first and second address signals by accessing the look-up table, at each second clock being faster than the first clock; and e) generating sine and cosine function values for the first digital phase values by multiplexing the sine and cosine function values obtained in the step d) according to the first bit group.

In order to achieve the second object, the present invention provides an apparatus for generating sine/cosine function values corresponding to a first digital phase values, comprising: an input unit for receiving a second digital phase values, obtained by performing 2π modulo operation for the first digital phase values, having the first bit group representing a quadrant and the second bit group representing a phase value, at each first clock; a memory unit having as much storage locations as determined by the second bit group, for sequentially storing one of sine and cosine function values for phase values of any one quadrant, in the form of a look-up table; address generating means for generating a first address signal from the second bit group supplied from the input unit and a second address signal by inverting the second bit group; a first function value generator for generating sine and cosine function values for the same phase value corresponding to both the first and second address signals by accessing the memory unit, at each second clock being faster than the first clock; and a second function value generator for generating sine and cosine function values for the first digital phase values by multiplexing the sine and cosine function values obtained in the first function value generator according to the first bit group supplied from the input unit.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

A sine function value sin θ for a phase θ within the range of 0 to 2π can be derived as the following Expression 1, by using a sine function value sin $\theta_{ref}$ and a cosine function value cos $\theta_{ref}$ for a phase $\theta_{ref}$ within the range of 0 to π/2.

$$\begin{aligned}\sin\theta &= \sin\theta_{ref}, && (0 \le \theta \le \pi/2) \\ &= \sin(\theta_{ref} + \pi/2) = \cos\theta_{ref}, && (\pi/2 \le \theta \le \pi) \\ &= \sin(\theta_{ref} + \pi) = -\sin\theta_{ref}, && (\pi/2 \le \theta \le 3\pi/2) \\ &= \sin(\theta_{ref} + 3\pi/2) = -\cos\theta_{ref}, && (3\pi/2 \le \theta \le 2\pi).\end{aligned} \quad \text{Expression 1}$$

Meanwhile, a cosine function value cos θ for a phase θ within the range of 0 to 2π can be derived as the following Expression 2, by using a sine function value sin θ ref and a cosine function value cos $\theta_{ref}$ for a phase $\theta_{ref}$ within the range of 0 to π/2.

$$\begin{aligned}\cos\theta &= \cos\theta_{ref}, && (0 \le \theta \le \pi/2) \\ &= \cos(\theta_{ref} + \pi/2) = -\sin\theta_{ref}, && (\pi/2 \le \theta \le \pi) \\ &= \cos(\theta_{ref} + \pi) = -\cos\theta_{ref}, && (\pi/2 \le \theta \le 3\pi/2) \\ &= \cos(\theta_{ref} + 3\pi/2) = \sin_{ref}, && (3\pi/2 \le \theta \le 2\pi).\end{aligned} \quad \text{Expression 2}$$

Since a phase difference between the sine function and the cosine function is π/2, the following Expression 3 is derived from their relationship.

$$\sin\theta = \cos(\pi/2 - \theta) \quad \text{Expression 3.}$$

As shown by the Expressions 1 to 3, sine and cosine function values for phase values of first to fourth quadrants can be determined from the function values for phase values of one quadrant in the sine function or cosine function.

Figure 1:
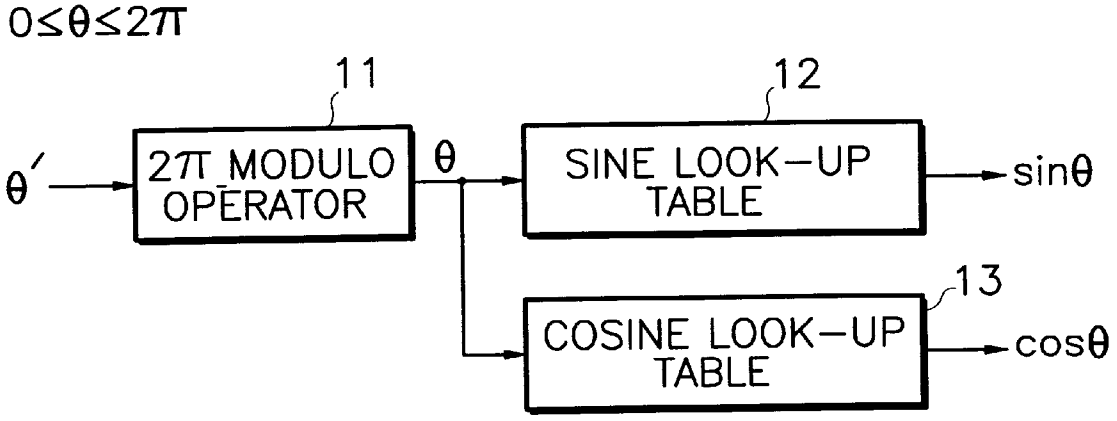
FIG. 1 is a block diagram illustrating an input/output relationship of a conventional trigonometric function look-up table.
Figure 2:
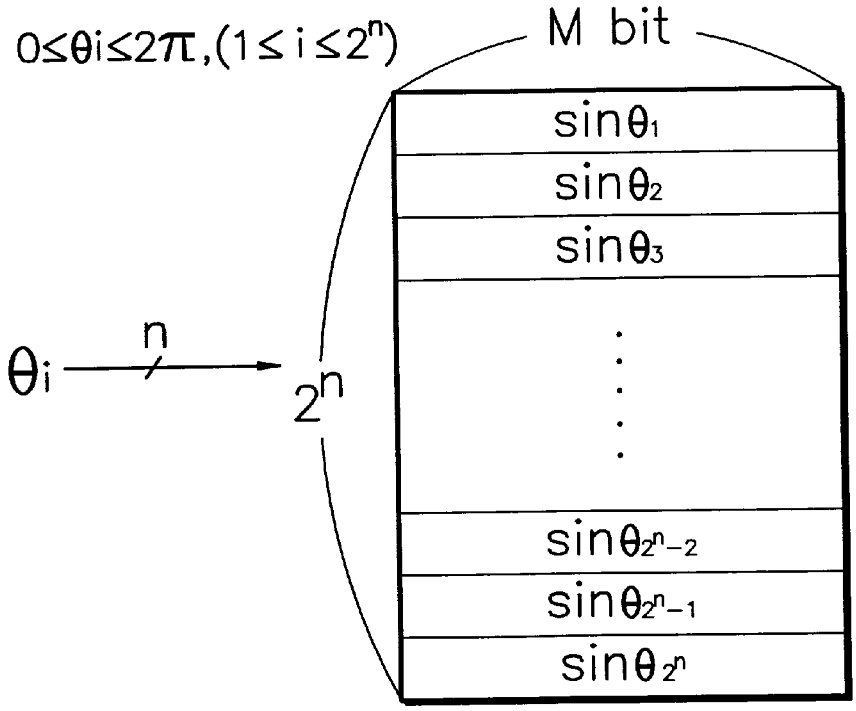
FIG. 2 is a memory map of a conventional sine/cosine look-up table using a ROM.
Figure 3:
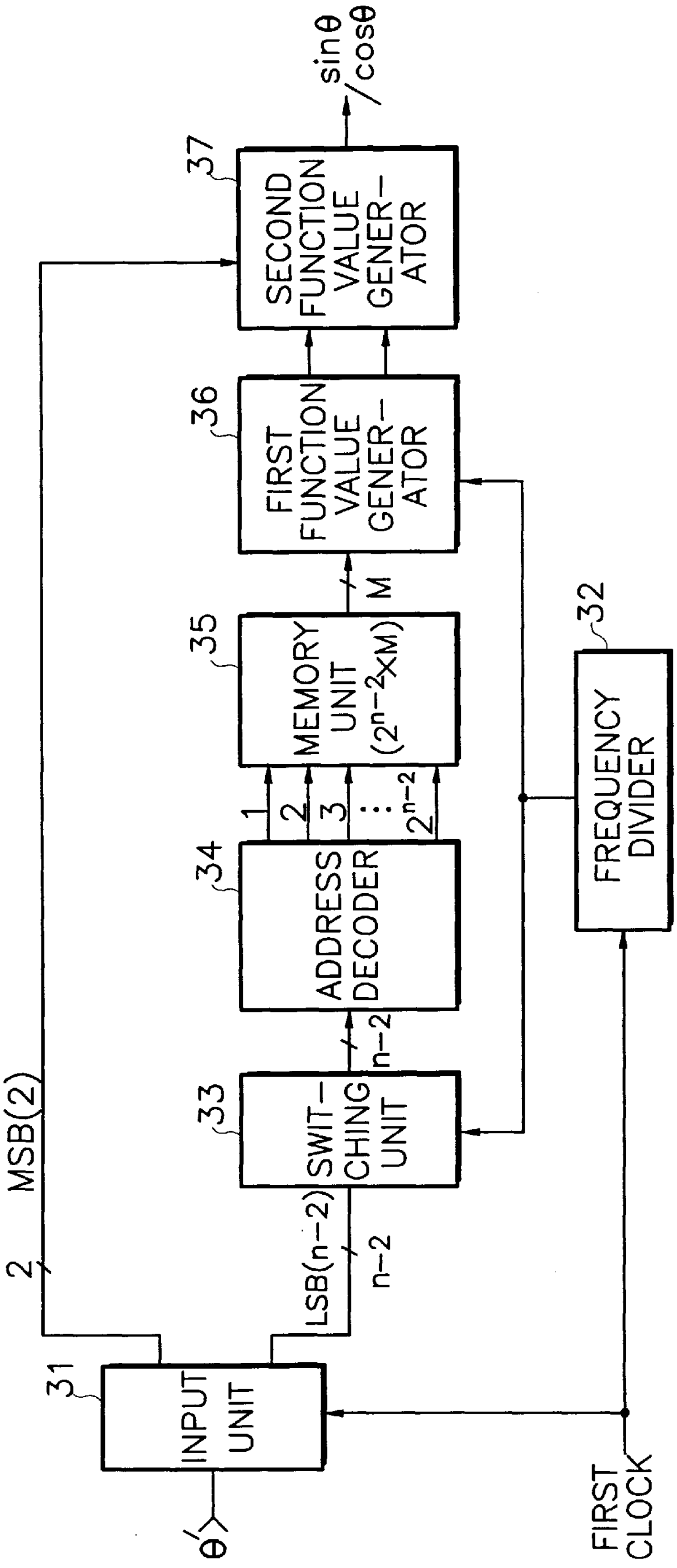
FIG. 3 is a block diagram illustrating a sine/cosine function generator according to a preferred embodiment of the present invention, in a digital signal processor.

FIG. 3 shows a block diagram illustrating a sine/cosine function generator according to the present invention, in a digital signal processor. The sine/cosine function generator comprises an input unit 31, a frequency divider 32, a switching unit 33, an address decoder 34, a memory unit 35, a first function value generator 36, and a second function value generator 37.

Referring to FIG. 3, the input unit 31 performs 2π modulo operation for a first digital phase signal θ', generates a second digital phase signal θ comprising a first bit group of 2 bits and a second bit group of (n−2) bits, and supplies respectively the first and second bit groups to the second function value generator 37 and to the switching unit 33 according to a system clock, a first clock. Here, the first bit group is composed of the most significant bit (MSB) and its adjacent bit or the least significant bit (LSB) and its adjacent bit, for determining a quadrant of a second phase signal θ, and the second bit group is composed of the rest (n−2) bits, which exclude the first bit group. Additionally, the input unit 31 may further comprise an analog/digital converter (not shown) for quantizing an input analog phase signal and generating the first digital phase signal θ'.

The frequency divider 32 generates a second clock by frequency-dividing the first clock by 2, and supplies it to the switching unit 33 and to the first function value generator 36.

The switching unit 33 receives the second bit group (LSB(n−2)) outputted from the input unit 31, supplies the second bit group as a first intermediate address signal I_ADDR1 to the address decoder 34 during the first half period of the first clock according to the second clock, and supplies a signal comprising of inverted bits of the second bit group, as a second intermediate address signal I_ADDR2 to the address decoder 34 during the second half period of the first clock according to the second clock.

The address decoder 34 decodes the first and second intermediate address signals I_ADDR1 and I_ADDR2 outputted from the switching unit 33, and generates a first and second address signals ADDR1 and ADDR2 for indicating an actual storage location in the memory unit 35.

The memory unit 35 comprises a look-up table for storing $2^{(n-2)}$ number of M-bits sine function values (or cosine function values) for the phase within the range 0≦θ≦π/2. At this time, the look-up table stores sequentially one of the sine and cosine function values according to the magnitude of the phase value.

The first function value generator 36 latches a first sin $\theta_{ref}$ value and a second sin $\theta_{ref}$ value outputted from the memory unit 35 according to the first and second address signals ADDR1 and ADDR2, being synchronized with the second clock. When $2^{(n-2)}$ number of M-bits cosine function values for the phase within the range 0≦θ≦π/2 are stored in the memory unit 35, the first function value generator 36 latches a first cos $\theta_{ref}$ value and a second cos $\theta_{ref}$ value outputted from the memory unit 35 according to the first and second address signals ADDR1 and ADDR2, being synchronized with the second clock.

The second function value generator 37 generates a sin θ value and a cos θ value between 0≦θ≦2π, from the first and second sin $\theta_{ref}$ values between 0≦$\theta_{ref}$≦π/2 corresponding to the second digital phase signal θ, according to the first bit group. When $2^{(n-2)}$ number of M-bits cosine function values for the phase within the range 0≦θ ≦π/2 are stored in the memory unit 35, the second function value generator 37 generates a sin θ value and a cos θ value between 0≦θ≦2π, from the first and second cos $\theta_{ref}$ values between 0≦$\theta_{ref}$≦π/2 corresponding to the second digital phase signal θ, according to the first bit group. The second function value generator 37 may further comprise a digital/analog converter (not shown) for converting the generated digital sine and cosine function values to analog function values.

Figure 4:
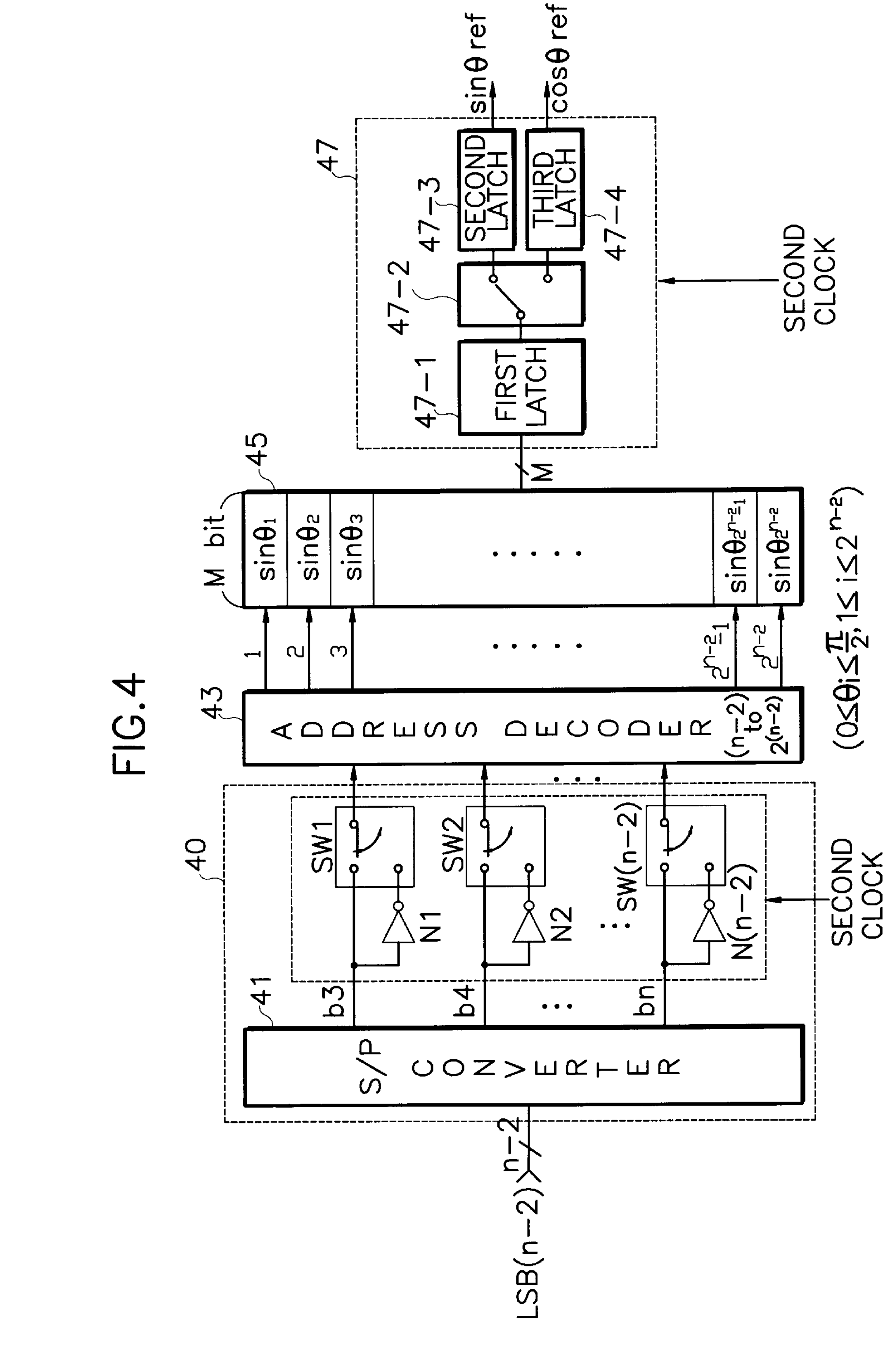
FIG. 4 is a detailed block diagram of a switching unit and a first function value generator illustrated in FIG. 3.

FIG. 4 shows a detailed block diagram of the switching unit 33 and the first function value generator 36 for accessing the memory unit 35 illustrated in FIG. 3. The switching unit 40 comprises a serial-to-parallel (S/P) converter 41 for converting the second bit group into a parallel bit streams, (n−2) number of inverters N1 through N(n−2) for inverting each bit of the parallel bit streams b3 through b(n−2), and (n−2) number of switches SW1 through SW(n−2) for switching each bit of the parallel bit streams and inverted bit of corresponding bit, according to the second clock. In addition, the first function value generator 47 comprises a first latch 47-1 for temporally storing the sine function values (or cosine function values) of M-bits outputted from the memory unit 45, a switch 47-2 for switching an output from the first latch 47-1 according to the second clock, and second and third latches 47-3 and 47-4 for storing the sine function value switched by the switch 47-2, according to the second clock.

Referring to FIG. 4, the switching unit 40 supplies a signal comprising of the second bit group as the first intermediate address signal I_ADDR1 during the first half period of the first clock, and a signal comprising of each bit of the second bit group inverted by the inverters N1 through N(n−2) as the second intermediate address signal I_ADDR2 during the second half period of the first clock, being synchronized with the second clock. The first and second intermediate address signals I_ADDR1 and I_ADDR2 are decoded to the first and second address signals ADDR1 and ADDR2 for accessing the storage locations of maximum $2^{(n-2)}$ number of columns in the memory unit 45 through the address decoder 43.

In the look-up table of the memory unit 45, sin $\theta_i$ values of $2^{(n-2)}$ number of M-bits corresponding to the phase of the range $0 \leqq \theta_i \leqq \pi/2$ are stored in the order of a storage location of a first column according the magnitude of the phase $(\theta_1 < 74\ _2{}^{(n-2)})$. Contents (function values) corresponding to the first and second address signals ADDR1 and ADDR2 from the address decoder 43 are read from the look-up table. Namely, when a datum stored in the first address signal ADDR1 is a value of the sin $\theta_{ref}$, a datum stored in the second address signal ADDR2 is a value of $\sin(\pi/2-\theta_{ref})$, this value is identical with the cos $\theta_{ref}$, as shown in the Expression 3. Therefore, according to the first and second address signals ADDR1 and ADDR2, the sine and cosine finction values for the same phase values are read from the memory unit 45.

In the first function value generator 47, the first latch 47-1, synchronized with the second clock, is connected to the second latch 47-3 during the first half period of the first clock by the switch 47-2, and is also connected to the third latch 47-4 during the second half period of the second clock. Accordingly, the first sine function value sin $\theta_{ref}$ outputted from the memory unit 45 during the first half period of the first clock is stored in the second latch 47-3 through the first latch 47-1 and the switch 47-2, and the second sine function value, that is, the first cosine function value cos $\theta_{ref}$ outputted from the memory unit 45 during the second half period of the second clock is stored in the third latch 47-4 through the first latch 47-1 and the switch 47-2.

Figure 5:
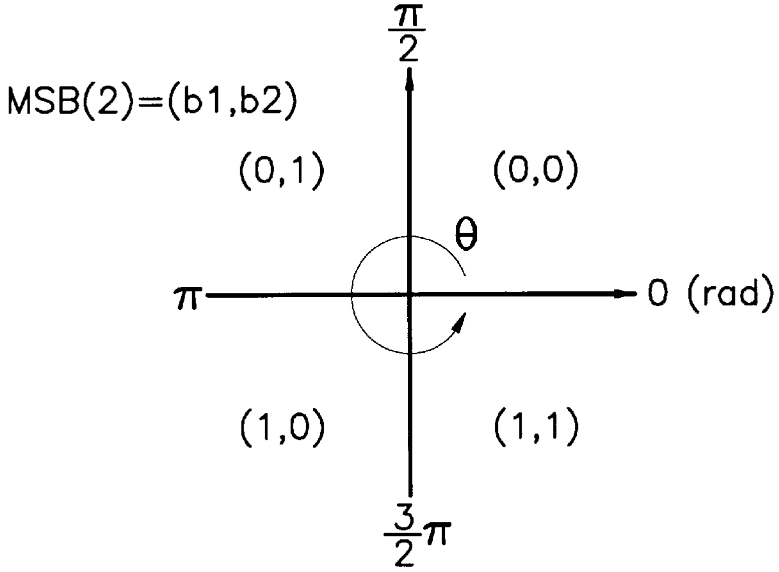
FIG. 5 is a sign map for determining a sign of a sine/cosine function value according to quadrant in which a phase value is existed.
Figure 6:
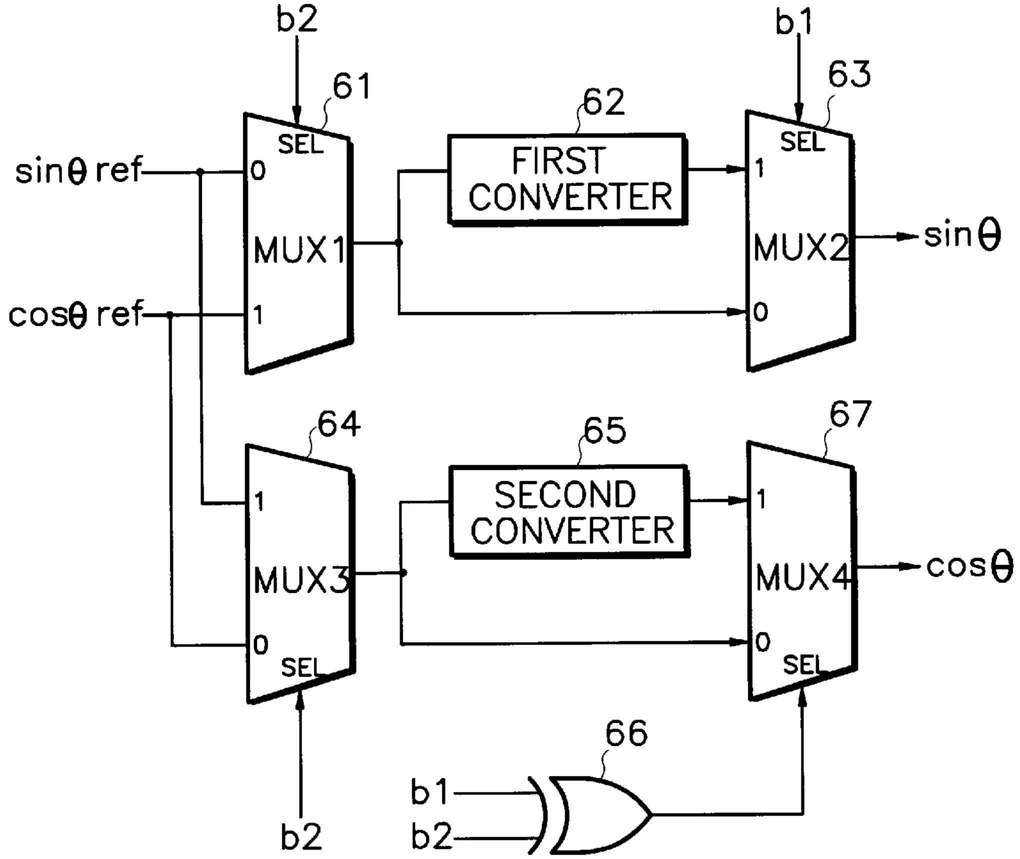
FIG. 6 is a detailed block diagram of a second function value generator illustrated in FIG. 3.

FIG. 5 shows a sign map for determining the sign of the sine/cosine function value for the each phase. Trigonometric function signs are sin θ>0 and cos θ>0 when the phase is the first quadrant; sin θ>0 and cos θ<0 when the phase is the second quadrant; sin θ<0 and cos θ<0 when the phase is the third quadrant; and sin θ<0 and cos θ>0 when the phase is the fourth quadrant. In the embodiment of the present invention, the second bit group MSB(2)=(b1, b2) of the second digital phase signal θ is used to determine the sign. At this time, the bit mapping allocates the phase of the first quadrant to b1=0, b2=0, the phase of the second quadrant to b1=0, b2=1, the phase of the third quadrant to b1=1, b2=0, and the phase of the fourth quadrant to b1=1, b2=1. Referring to FIG. 6, a process for determining the sign of the function value according to the MSB of 2bits (b1, b2) will be described in detail.

FIG. 6 is a detailed block diagram of the second function value generator 37 illustrated in FIG. 3. The second function value generator 37 comprises a first multiplexer MUX1;61, a first converter 62, a second multiplexer MUX2;63, a third multiplexer MUX3;64, a second converter 65, an exclusive OR gate 66, and a fourth multiplexer MUX4;67.

Referring to FIG. 6, the first multiplexer 61 outputs selectively the value sin $\theta_{ref}$ from the second latch 47-3 applied to a first input port '0' and the value cos $\theta_{ref}$ from the third latch 47-4 applied to a second input port '1' by using the bit b2 of the second bit group as a selection signal. Namely, the first multiplexer 61 outputs the value sin $\theta_{ref}$ when the bit b2 is "0", and the value cos $\theta_{ref}$ when the bit b2 is "1".

The first converter 62 converts the output from the first multiplexer 61 to a negative value, and applies it to the second input port '1' of the second multiplexer 63.

The second multiplexer 63 outputs selectively the output from the first multiplexer 61 applied to its first input port '0' and the output from the first converter 62 applied to the second input port '1', by using the bit b1 of the second bit group as the selection signal. Namely, the second multiplexer 63 outputs the output from the first multiplexer 61 when the bit b1 is "0", and the output from the first converter 62 when the bit b1 is "1". In other words, the output value from the second multiplexer 63 is sin $\theta_{ref}$ when the value of (b1, b2) is (0, 0); cos $\theta_{ref}$ when the value of (b1, b2) is (0, 1); −sin $\theta_{ref}$ when the value of (b1, b2) is (1, 0); and −cos $\theta_{ref}$ when the value of (b1, b2) is (1, 1). These above function values, as shown in phase mapping diagram of FIG. 5 and the Expression 1, represent the sine function value sin θ for the phase value within the range of 0 to 2π.

The third multiplexer 64 outputs selectively the value sin $\theta_{ref}$ from the second latch 47-3 applied to its second input port '1' and the value cos $\theta_{ref}$ from the third latch 47-4 applied to the first input port '0', by using the bit b2 of the second bit group as the selection signal. Namely, the third multiplexer 64 outputs selectively the value sin $\theta_{ref}$ when the bit b2 is "1", and the value cos $\theta_{ref}$ when the bit b2 is "0".

The second converter 65 converts the output from the third multiplexer 64 to a negative value, and applies it to the second input port '1' of the fourth multiplexer 67.

The exclusive OR gate 66 performs an exclusive OR operation for the 2-bits of the first bit group (b1, b2), and supplies the result as a selection signal to the fourth multiplexer 67.

The fourth multiplexer 67 outputs selectively the output from the third multiplexer 64 applied to its first input port '0' and the output from the second converter 65 applied to the second input port '1', by using an output from the exclusive OR gate 66 as the selection signal. Namely, the fourth multiplexer 67 outputs the output from the third multiplexer 64 when the output from the exclusive OR gate 66 is '0', and the output from the second converter 65 when the output from the exclusive OR gate 66 is '1'. In other words, the output value from the fourth multiplexer 67 is cos $\theta_{ref}$ when the value of (b1, b2) is (0, 0), −sin $\theta_{ref}$ when the value of (b1, b2) is (0, 1), −cos $\theta_{ref}$ when the value of (b1, b2) is (1, 0), and sin $\theta_{ref}$ when the value of (b1, b2) is (1, 1). These above function values, as shown in phase mapping diagram of FIG. 5 and the Expression 2, represent the cosine function value cos θ for the phase value within the range of 0 to 2π.

FIGS. 7A to 7H are timing diagrams for describing operations of each component illustrated in FIGS. 3, 4 and 6. Here, FIG. 7A indicates the first clock, FIG. 7B indicates the second digital phase signal θ, FIG. 7C indicates the second clock, FIG. 7D indicates the first and second address signals ADDR1 and ADDR2, FIG. 7E indicates a function value stored in the first latch (47-1 in FIG. 4), FIG. 7F indicates a function value latched in the second latch (47-3 in FIG. 4), FIG. 7G indicates a function value latched in the third latch (47-4 in FIG. 4), and FIG. 7H indicates a function value outputted from the second function value generator (37 in FIG. 3).

Figures 7A, 7B, 7C, 7D, 7E, 7F, 7G, 7H:
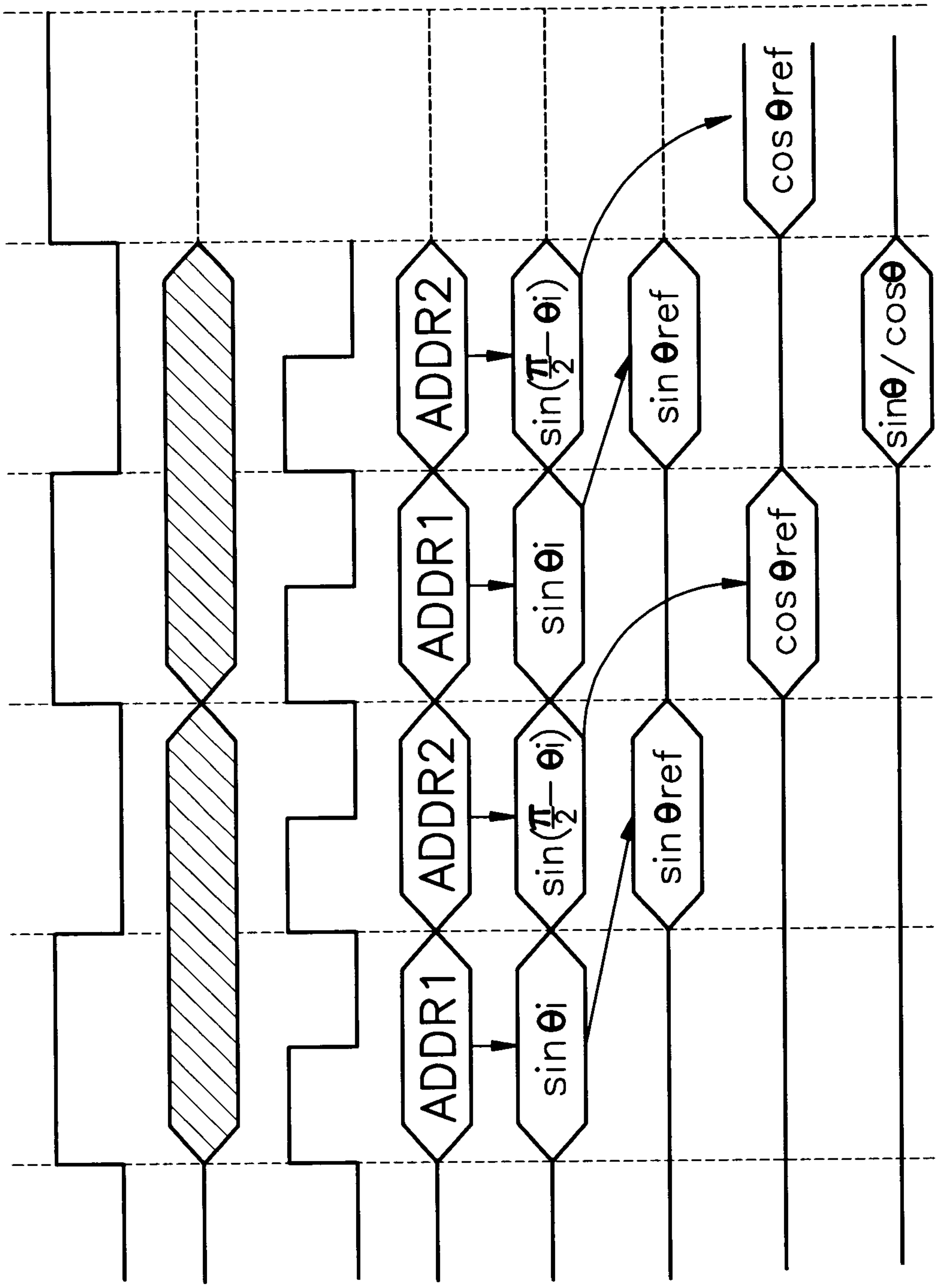
FIGS. 7A to 7H are timing diagrams for describing operations of each component illustrated in FIGS. 3, 4 and 6.

As shown in FIGS. 7A to 7H, the second digital phase signal (θ; FIG. 7B) is maintained during the first period of the first clock (FIG. 7A). Meanwhile, by being synchronized with the second clock (FIG. 7C), the first address signal ADDR1 (FIG. 7D) is generated from the second bit group of the second digital phase signal (θ; FIG. 7B) during the first half period of the first clock (FIG. 7A), and sin $\theta_i$ (FIG. 7E) is read from the memory unit 35. During the second half period of the first clock (FIG. 7A), the second address signal ADDR2 (FIG. 7D) is generated from the signal for inverting the second bit group of the second digital phase signal (θ; FIG. 7B), and cos $\theta_i$=sin(π/2−74 $_i$) (FIG. 7E) is read from the memory unit 35 and stored to the first latch 47-1.

The contents stored in the first latch 47-1 are latched and outputted by the second latch 47-3 or the third latch 47-4 at the next rising edge of the second clock (FIG. 7C). The second latch 47-3 latches the value sin $\theta_i$ (FIG. 7F), and this value is a function value corresponding to the phase $0 \leqq \theta_i \leqq \pi/2$ represented as sin $\theta_{ref}$. The third latch 47-4 latches the value cos $\theta_i$=sin(π/2−$\theta_i$) (FIG. 7F), and this value is a function value corresponding to the phase, $0 \leqq \theta_i \leqq \pi/2$, represented as cos $\theta_{ref}$. Accordingly, the sine and cosine function values for the second digital phase values θ (FIG. 7B) is outputted from the second function value generator (37 of FIG. 3) as shown in FIG. 7H As described above, the present invention efficiently decreases the memory capacity for storing the look-up table by using periodical and symmetrical characteristics of the sine/cosine function. Namely, the present invention can decrease the memory capacity to ¼ of the conventional system using sine look-up table (or cosine look-up table), and to ⅛ of the memory capacity of the conventional system using both the sine and cosine look-up tables.

As described above, in accordance with the present invention, sine/cosine function values for phase values of the range, $0 \leqq \theta \leqq 2\pi$ are obtained by multiplexing the s sine/cosine function values obtained from the look-up table, which stores only the sine function value for the phase value of the range, $0 \leqq \theta > \pi/2$, or the look-up table, which stores only the cosine function value for the phase value of the range, $0 \leqq \theta \leqq \pi/2$. Therefore, the capacity of memory needed for the look-up table can be decreased without an excessive increase in hardware.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method for generating sine/cosine function values corresponding to a first digital phase values, comprising the steps of:

a) receiving a second digital phase values, obtained by performing 2π modulo operation for the first digital phase values, having the first bit group representing a quadrant and the second bit group representing a phase value, at each first clock;

b) forming a look-up table having as much storage locations as determined by the second bit group, for converting phase values of any one quadrant to one of sine and cosine function values;

c) generating a first address signal from the second bit group and a second address signal by inverting the second bit group;

d) generating sine and cosine function values for the same phase value corresponding to both the first and second address signals by accessing said look-up table, at each second clock being faster than the first clock; and e) generating sine and cosine function values for the first digital phase values by multiplexing the sine and cosine function values obtained in said step d) according to the first bit group.

2. The method of claim 1, wherein the first bit group comprises a most significant bit and its adjacent bit of the second digital phase values.

3. The method of claim 1, wherein the first bit group comprises a least significant bit and its adjacent bit of the second digital phase values.

4. The method of claim 1, wherein the second clock is obtained by frequency-dividing the first clock by 2.

5. An apparatus for generating sine/cosine function values corresponding to a first digital phase values, comprising:

input means for receiving a second digital phase values, obtained by performing 2π modulo operation for the first digital phase values, having the first bit group representing a quadrant and the second bit group representing a phase value, at each first clock;

memory means having as much storage locations as determined by the second bit group, for sequentially storing one of sine and cosine function values for phase values of any one quadrant, in the form of a look-up table;

address generating means for generating a first address signal from the second bit group supplied from said input means and a second address signal by inverting the second bit group;

a first function value generator for generating sine and cosine function values for the same phase value corresponding to both the first and second address signals by accessing said memory means, at each second clock being faster than the first clock; and a second function value generator for generating sine and cosine function values for the first digital phase values by multiplexing the sine and cosine function values obtained in said first function value generator according to the first bit group supplied from said input means.

6. The apparatus of claim 5, wherein the first bit group comprises a most significant bit and its adjacent bit of the second digital phase values.

7. The apparatus of claim 6, wherein said second function value generator comprises:

a first multiplexer for supplying one of the sine and cosine function values obtained in said first function value generator, according to one of the bits of the first bit group;

a first converter for converting the output of said first multiplexer to a negative value;

a second multiplexer for supplying one of the output from said first multiplexer and output from said first converter as the sine function values for the first digital phase values, according to the other bit of the first bit group;

a third multiplexer for supplying one of the sine and cosine function values obtained in said first function value generator, according to one of the bits of the first bit group;

a second converter for converting the output of said third multiplexer to a negative value;

an exclusive OR gate for performing an exclusive OR operation for the first bit group; and a fourth multiplexer for supplying one of the output from said third multiplexer and output from said second converter as the cosine function values for the first digital phase values, according to the output of said exclusive OR gate.

8. The apparatus of claim 5, wherein the first bit group comprises a least significant bit and its adjacent bit of the second digital phase values.

9. The apparatus of claim 8, wherein said second function value generator comprises:

a first multiplexer for supplying one of the sine and cosine function values obtained in said first function value generator, according to one of the bits of the first bit group;

a first converter for converting the output of said first multiplexer to a negative value;

a second multiplexer for supplying one of the output from said first multiplexer and output from said first converter as the sine function values for the first digital phase values, according to the other bit of the first bit group;

a third multiplexer for supplying one of the sine and cosine function values obtained in said first function value generator, according to one of the bits of the first bit group;

a second converter for converting the output of said third multiplexer to a negative value;

an exclusive OR gate for performing an exclusive OR operation for the first bit group; and a fourth multiplexer for supplying one of the output from said third multiplexer and output from said second converter as the cosine function values for the first digital phase values, according to the output of said exclusive OR gate.

10. The apparatus of claim 5, wherein the apparatus further comprises a frequency divider for frequency-dividing the first clock by 2 to generate the second clock.

11. The apparatus of claim 5, wherein said address generating means comprises:

a serial-to-parallel converter for converting the second bit group into a parallel bit streams;

a plurality of inverters for inverting each bit of the parallel bit streams supplied from said serial-to-parallel converter;

a plurality of switches for switching one of the second bit group and the output of said inverters, at each second clock; and an address decoder for generating the first address signal from the second bit group and the second address signal from the output of said inverters, supplied from said switches, respectively.

12. The apparatus of claim 5, wherein said first function value generator comprises:

a first latch for latching the sine and cosine function values for the same phase value read from said memory means, at each second clock;

a second latch for latching the sine function values supplied from said first latch, at each second clock;

a third latch for latching the cosine function values supplied from said first latch, at each second clock; and a switch for connecting said first latch to said second latch during the first half period of the first clock and connecting said first latch to said third latch during the second half period of the first clock, at each second clock.

* * * * *